United States Patent [19]

Sawase et al.

[11] Patent Number: 5,784,637

[45] Date of Patent: Jul. 21, 1998

[54] SINGLE-CHIP SEMICONDUCTOR INTEGRATED CIRCUIT DEVICE AND MICROCOMPUTER INTEGRATED ON A SEMICONDUCTOR CHIP

[75] Inventors: Terumi Sawase, Sayama; Kouki Noguchi, Kokubunji; Hideo Nakamura, Nishitama; Yasushi Akao, Kokubunji; Shiro Baba, Tokorozawa; Yoshimune Hagiwara, Hachioji, all of Japan

[73] Assignee: Hitachi, Ltd., Tokyo, Japan

[21] Appl. No.: 414,157

[22] Filed: Mar. 31, 1995

Related U.S. Application Data

[63] Continuation of Ser. No. 217,826, Mar. 25, 1994, Pat. No. 5,428,808, which is a continuation of Ser. No. 94,920, Jul. 22, 1993, Pat. No. 5,321,845, which is a continuation of Ser. No. 892,718, May 29, 1992, abandoned, which is a continuation of Ser. No. 238,534, Aug. 31, 1988, abandoned.

[30] Foreign Application Priority Data

Sep. 9, 1987 [JP] Japan ................. 62-223918
Apr. 15, 1988 [JP] Japan ................. 63-91563

[51] Int. Cl.$^6$ ..................................... G06F 9/24
[52] U.S. Cl. ..................... 395/800.37; 395/800.33
[58] Field of Search ................... 395/800, 550, 395/775, 430, 180, 800.33, 800.37; 364/DIG. 1, DIG. 2

[56] References Cited

U.S. PATENT DOCUMENTS

| | | | |
|---|---|---|---|
| 4,247,194 | 1/1981 | Kubota et al. | 355/206 |
| 4,354,228 | 10/1982 | Moore et al. | 395/800 |
| 4,382,279 | 5/1983 | Ugon | 395/800 |
| 4,392,198 | 7/1983 | Shimazaki | 395/387 |
| 4,396,980 | 8/1983 | Hingarh | 395/800 |
| 4,484,260 | 11/1984 | Blahut et al. | 364/716 |

(List continued on next page.)

FOREIGN PATENT DOCUMENTS

| | | |
|---|---|---|
| 0239283 | 9/1987 | European Pat. Off. |
| 2079996 | 1/1982 | United Kingdom |

OTHER PUBLICATIONS

Altera EP1200 Erasasble Programmable Logic Device Data sheet, Rev. 1.1, 1985 pp. 1–12.

McMorrow, Scott, "In–Circuit Logic Device Can Be Reprogrammed on the Fly", Electronic Design, Aug. 7, 1986, pp. 94–97.

Goss, Larry L., "Single Chip Microcomputer with EEROM Allows Flexible System Design", WESCON '83, vol. 27, 1983, p. 34/2 (1–4).

English language Abstract of Japanese Patent Publication No. 60–198667, Patent Abstracts Of Japan, vol. 10, No. 53 (P-433), Mar. 4, 1986.

English language Abstract of Japanese Patent Publication No. 61–285567, Patent Abstracts Of Japan, vol. 11, No. 151(P-576), May 16, 1987.

*Primary Examiner*—Meng-Ai T. An
*Attorney, Agent, or Firm*—Kenyon & Kenyon

[57] ABSTRACT

A semiconductor integrated circuit device formed on a single chip or a microcomputer integrated on a semiconductor chip includes a central processing unit (CPU), an interface circuit (or an input/output port), a bus coupled to the CPU and the interface circuit (or the input/output port) and a variable logic circuit (or a subprocessor). The variable logic circuit (or the subprocessor) includes non-volatile memory elements storing instructions, a control circuit generating control signals in accordance with the stored instructions, and an arithmetic logic unit controlled by the generated control signals. Information can be written into the non-volatile memory elements from outside to construct the variable logic circuit or the subprocessor with any desired logical functions. The wiring operation of the memory elements can be executed in a short time, and a user can thus quickly obtain a single-chip microprocessor or a single-chip semiconductor integrated circuit device having hardware of peculiar prescribed specifications.

8 Claims, 10 Drawing Sheets

U.S. PATENT DOCUMENTS

| | | | |
|---|---|---|---|
| 4,491,907 | 1/1985 | Koeppen et al. | 395/800 |
| 4,594,661 | 6/1986 | Moore et al. | 395/775 |
| 4,609,986 | 9/1986 | Hartmann et al. | 326/45 |
| 4,617,479 | 10/1986 | Hartmann et al. | 365/185.17 |
| 4,631,665 | 12/1986 | Yokouchi | 395/550 |
| 4,713,792 | 12/1987 | Hartmann et al. | 395/430 |
| 4,720,811 | 1/1988 | Yamaguchi et al. | 395/550 |
| 4,745,579 | 5/1988 | Mead et al. | 365/104 |
| 4,761,647 | 8/1988 | Hallenbeck et al. | 340/825.22 |
| 4,791,603 | 12/1988 | Henry | 326/38 |
| 4,794,558 | 12/1988 | Thompson | 395/800 |
| 4,802,119 | 1/1989 | Heene et al. | 395/182.05 |
| 4,807,114 | 2/1989 | Itoh | 395/800 |
| 4,847,612 | 7/1989 | Kaplinsky | 340/825.8 |
| 4,860,191 | 8/1989 | Nomura et al. | 395/800 |
| 5,088,023 | 2/1992 | Nakamura et al. | 395/430 |
| 5,175,240 | 12/1992 | Sawase et al. | 395/430 |
| 5,179,694 | 1/1993 | Keida et al. | 395/180 |
| 5,261,110 | 11/1993 | Mitsuishi et al. | 395/800 |
| 5,276,839 | 1/1994 | Robb et al. | 395/425 |
| 5,293,586 | 3/1994 | Yamazaki et al. | 395/164 |
| 5,307,464 | 4/1994 | Akao et al. | 395/352 |
| 5,313,650 | 5/1994 | Mitsuishi et al. | 395/800 |
| 5,444,861 | 8/1995 | Adamec et al. | 395/712 |

SINGLE-CHIP SEMICONDUCTOR INTEGRATED CIRCUIT DEVICE AND MICROCOMPUTER INTEGRATED ON A SEMICONDUCTOR CHIP

This is a continuation of U.S. patent application Ser. No. 08/217,826 filed on Mar. 25, 1994 now U.S. Pat. No. 5,428,808 issued on Jun. 27,1995, which is a continuation of U.S. patent application Ser. No. 08/094,920 filed on Jul. 22, 1993, now U.S. Pat. No. 5,321,845, issued on Jun. 14,1994, which is a continuation of U.S. Pat. application Ser. No. 07/892,718 filed on May 29, 1992 abandoned, which is a continuation of U.S. patent application Ser. No. 07/238,534 filed on Aug. 31, 1988 abandoned.

BACKGROUND OF THE INVENTION

The present invention relates to a semiconductor integrated circuit, and more particularly to a single-chip microcomputer (hereinbelow, sometimes termed "MC"). The present invention greatly reduces the number of components when constructing a system. The present invention is also well suited to perform the functions of writing data into a built-in nonvolatile memory and of verifying data using an identical sequence.

As described in Japanese Patent Application Laid-open No. 285567/1986, a prior-art apparatus has been constructed so that an MC and a PLA (Programmable Logic Array) are integrated on one chip, and the PLA operates in response to external inputs without regard to the program of the MC, whereupon various functions are performed with the outputs of the PLA so as to allow the MC to operate with the outputs of the PLA.

The PLA is a logic circuit having a variable logical construction wherein the logical functions of the circuit can be constructed by electrically writing data into nonvolatile semiconductor memory elements.

Meanwhile, an improved PLA utilizing EPROM technology is disclosed in U.S. Pat. No. 4,609,986.

In addition, Japanese Patent Application Laid-open No. 198667/1985 discloses a semiconductor integrated circuit device wherein a data processing unit such as a CPU and a nonvolatile memory block for storing software are contained on the same chip.

Electrically-programmable logic devices are discussed in the product catalog of Altera Corporation, p. 12, and "Electronic Design", Aug. 7, 1986, pp. 94–97.

Although the apparatus of Japanese Patent Application Laid-open No. 285567/1986 reduces the number of components in certain applications, it has the problem that versatility is not addressed sufficiently, so that a wide range of applications cannot be covered. Besides, U.S. Pat. No. 4,609,986 merely discloses the PLA itself, and it has not given any consideration to an apparatus in which the PLA, namely, a programmable logic circuit and an MC are fabricated into one chip in order to enhance the versatility of a single-chip microcomputer.

Meanwhile, Japanese Patent Application Laid-open No. 198667/1985 merely discloses that the memory block for storing a program which is the software of a single-chip microcomputer is constructed of a nonvolatile memory, into which data is written from outside the chip by a user, whereby a desired single-chip microcomputer is offered to the user in a short delivery time. Japanese Patent Application Laid-open No. 198667/1985 has not given any consideration to an apparatus in which the user freely constructs a logic device for realizing the hardware of the single-chip microcomputer.

The software (program) of the single-chip microcomputer is developed by the user, and the developed software is written into the ROM (Read Only Memory) of the memory block of the single-chip microcomputer. Accordingly, the user can obtain the single-chip microcomputer having the desired software in a short period in such a way that the ROM is constructed of the nonvolatile memory and that the user can write data from outside the chip into the nonvolatile memory as desired.

On the other hand, regarding the hardware of single-chip microcomputers, individual users often have various prescribed specifications, and hence, the respective user prescribed specifications cannot be satisfied by a single hardware design. Accordingly, each user has heretofore added a random logic circuit or the like as an external circuit of the single-chip microcomputer in order to realize the user prescribed specifications. This has led to the problem that the number of components of the whole system is large.

The hardware of the single-chip microcomputer which each user has peculiar prescribed specifications, includes various units such as a key input encoder (an encoder by which input information from a keyboard is converted so as to be accepted by the single-chip microcomputer), a display decoder (a decoder by which the output information of the single-chip microcomputer is converted so as to drive a display unit), and a time-keeping timer.

SUMMARY OF THE INVENTION

The present invention relates to construction of a logic device (a random logic circuit), within the microprocessor, and to allowing the user to establish the logical functions of the logic device in accordance with write information afforded from outside the microprocessor.

In a typical embodiment of the present invention, a logic device constructed within a single-chip microprocessor is made of nonvolatile semiconductor memory elements which are electrically programmable.

Data which constructs the logic device is externally written into the nonvolatile semiconductor memory, whereby the logical functions of the logic device can be established by the user to satisfy the user's prescribed specifications.

Since the logical functions of the logic devices can be established by the user in accordance with information written from outside, various user prescribed specifications can be met by these established logical functions.

Writing the information into the nonvolatile semiconductor memory elements which construct the logic device can be executed in a short time. Therefore, each user can obtain in a short period a single-chip microcomputer which has the hardware of the peculiar prescribed specifications.

Accordingly, the present invention is well suited to obtain production of single-chip microcomputers in small quantities and of various types in short periods of time.

Other features of the present invention will become apparent from embodiments to be described later.

BRIEF DESCRIPTION OF THE DRAWINGS

FIG. 11(A) is a diagram showing the address space of the single-chip microcomputer in an example of the present invention, while

DETAILED DESCRIPTION

Now, embodiments of the present invention will be described with reference to the drawings.

Figure 1:
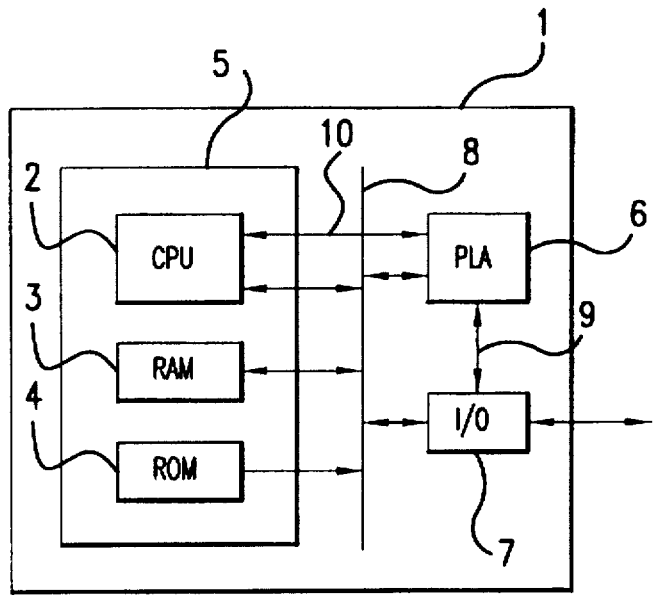
FIG. 1 is a block diagram of a single-chip microcomputer according to a first embodiment of the present invention.

FIG. 1 illustrates the architecture of a single-chip microcomputer according to the first embodiment of the present invention. The microcomputer is constructed on an identical semiconductor substrate 1 and of a processor 5 which comprises a CPU (central processing unit) 2, a RAM 3, and a ROM 4; a PLA (Programmable Logic Array) 6 which serves as a logic circuit of variable logical construction; and an input/output port (I/O) 7; the respective blocks being coupled by a common bus 8. In addition, the PLA 6 is directly connected to the I/O 7 and the CPU 2 by single lines 9 and 10, respectively.

The ROM 4 serves to store the software (program) of the single-chip MC. The PLA 6 operates as the logic device for realizing the hardware of the single-chip MC, and it includes nonvolatile memory elements which are electrically programmable.

Figure 2:
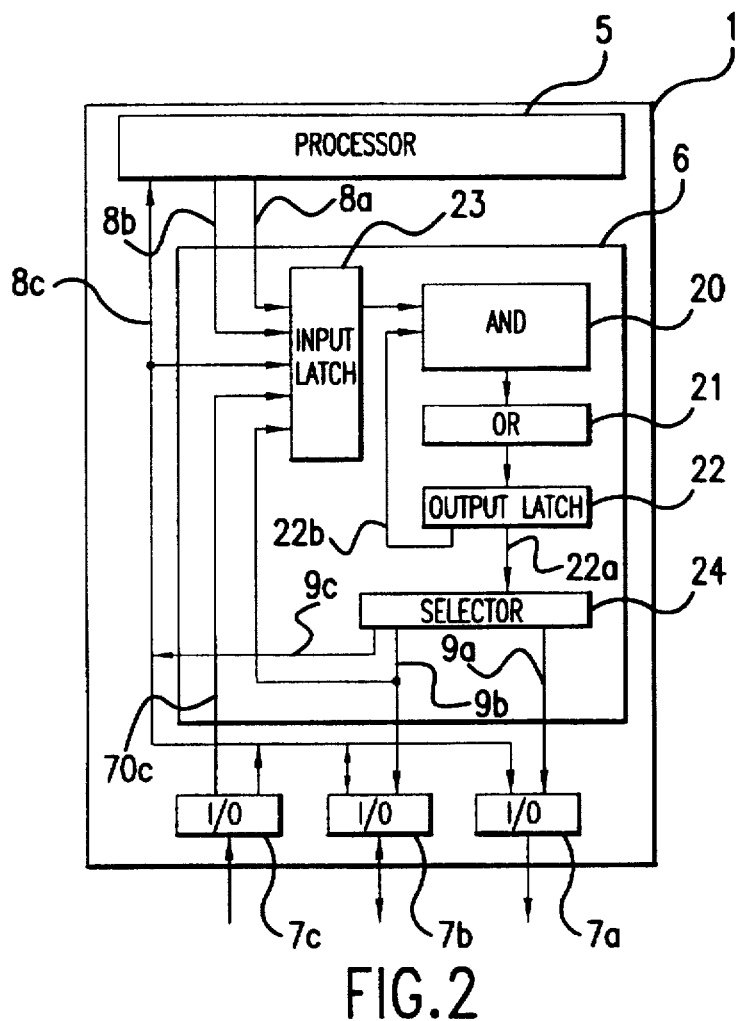
FIG. 2 is a detailed block diagram of the PLA in FIG. 1.

FIG. 2 is a detailed diagram of the configuration of the PLA 6 in FIG. 1. The PLA 6 is configured of the circuits of an AND (logical product) circuit 20, an OR (logical sum) circuit 21, an output latch 22, an input latch 23 and a selector 24; and wiring for connecting the circuits. The processor 5 and the PLA 6 are connected by a control signal line 8a for supplying the input latch 23 of the PLA 6 with a control signal generated in the processor 5, an address bus 8b, and a data bus 8c. The communications between the semiconductor substrate 1 and the exterior thereof are carried out through an output port 7a, an input/output port 7b and an input port 7c which are connected with the data bus 8c. The details of connections will be described below.

Inputs to the input latch 23 of the PLA 6 are the signal of the control signal line 8a, the address of the address bus 8b, the data of the data bus 8c, the output 70c of the input port 7c and the output 9b of the output selector 24, and they are converted into the input of the AND circuit 20 by the input latch 23. The output of the AND circuit 20 becomes the input of the OR circuit 21, the output of which is input to the output latch 22. The output 22a of the output latch 22 is input to the selector 24, and the partial signal 22b thereof is input to the AND circuit 20. Among the outputs of the selector 24, outputs 9a and 9b are respectively input to the output port 7a and the input/output port 7b, and the other output 9c is applied to the data bus 8c.

Figure 3:
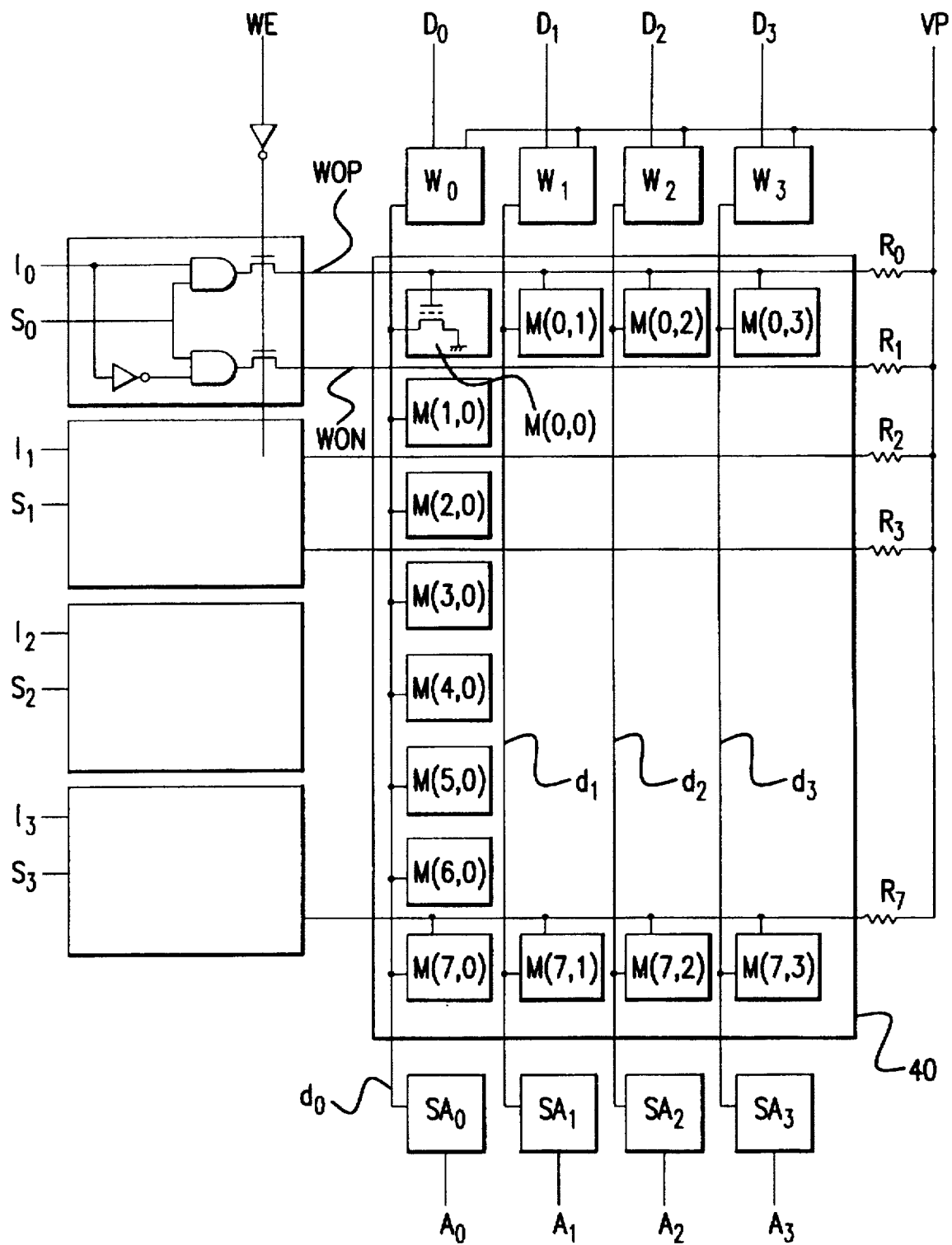
FIGS. 3 and 4 are circuit diagrams which explain the circuit of the PLA in FIG. 1 in more detail.

FIG. 3 shows an example in which the AND circuit 20 illustrated in FIG. 2 is constructed of electrically-programmable nonvolatile memory (EPROM) elements of the ultraviolet light-erasable type. This example is illustrated as a circuit in which the AND circuit has four inputs ($I_0$–$I_3$) and produces four independent AND outputs ($A_0$–$A_3$). An element matrix 40 is configured of EPROM elements $M(0, 0)$–$M(7,3)$ in 8 rows and 4 columns. The EPROM element is a well-known element, and shall be omitted from the detailed description. Here, a case where the element has a threshold voltage $V_{te}$ of low level (about 1 V) is defined as an erase state, and a case where it has a threshold voltage $V_{tw}$ of high level (5 V or above) is defined as a write state.

Data is written into the elements in column (4-bit) unit as follows: Data items to be written are applied to data inputs ($D_0$–$D_3$), and one of the select lines $S_0$–$S_3$ is selected (is set at a level "1"). Also, a write enable signal WE is set at the level "1", and a writing electric terminal $V_p$ at a write voltage (for example, about 12 V). On this occasion, whether positive logic or negative logic is written is determined by the state of the input $I_i$. More specifically, when the input $I_0$ is taken as an example, a word line $W_{OP}$ is selected for $I_0$="1", and a word line $W_{on}$ is selected for $I_0$="0". The word line (the gates of the memory elements) selected at this time has its voltage raised to the potential $V_p$ through a resistor $R_j$ (j=0–7). Besides, in accordance with the data items applied to the inputs $D_0$–$D_3$, voltage converters $W_0$–$W_3$ generate 0 in case of the data items of "0" and a drain voltage $V_D$ necessary for the writing operations of the memory elements in case of the data items of "1", so as to supply the write voltage to the memory elements through respective data lines $d_0$–$d_3$. Thus, the threshold voltage $V_{th}$ of the memory element which is initially in the erase state is held at the threshold voltage $V_{te}$ of the erase state when "0" has been applied to the data input D with respect to the selected word line W, and it becomes the threshold voltage $V_{tw}$ of the write state when "1" has been applied to the data input D.

By executing the above operations for all the rows, the program of the whole area $M(0, 0)$–$M(7,3)$ of the matrix can be performed.

In a case where the AND circuit 20 is operated for reading data, namely, for taking the logical products, the voltage $V_p$ is set at a main power source voltage $V_c$ or a ground voltage, and the write enable signal WE is set at "0".

In addition, all the select lines $S_0$–$S_3$ are set at "1", whereby unit AND data according to the values of the inputs $I_0$–$I_3$ is detected by sense amplifiers $SA_0$–$SA_3$ through the data lines $d_0$–$d_3$ and is output as the logical products ($A_0$–$A_3$).

Figure 4:
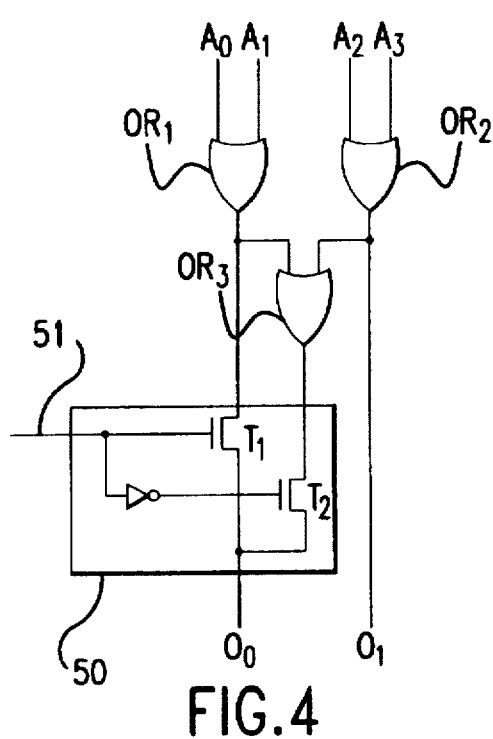

FIG. 4 shows the arrangement of the logical sum (OR) circuit 21 in FIG. 2. The OR circuit is configured of an OR gate OR1 which receives the AND outputs $A_0$ and $A_1$, an OR gate OR2 which receives the AND outputs $A_2$ and $A_3$, an OR gate OR3 which receives the outputs of the OR gates OR1 and OR2, and an output selecting circuit 50 which selects the output of the OR gate OR1 or that of the OR gate OR3.

When "1" is applied to the input 51 of the selecting circuit 50, a transistor T1 turns "on" and a transistor T2 turns "off", and the following logical expressions are obtained at the respective outputs of this circuit:

$$O_0=A_0+A_1$$

$$O_1=A_2+A_3$$

On the other hand, when "0" is applied to the input 51, the transistor T1 turns "off" and the transistor T2 turns "on", and the following logical expressions are obtained at the respective outputs:

$$O_0=A_0+A_1+A_2+A_3$$

$$O_1=A_2+A_3$$

According to this embodiment, several uses as illustrated in FIGS. 5(A)-5(D) are permitted by changing the input latch 23 and selector 24 shown in FIG. 2: (A) Inputs to the input latch 23 in FIG. 2 are set to be the signals of the buses 8a-8c, and an output from the selector 24 is applied to the port 7a or 7b, whereby an output from the processor 5 can be converted and then delivered out of the semiconductor substrate 1 by the PLA 6.

(B) An input to the input latch 23 is set to be the signal of the port 7b or 7c, and an output from the selector 24 is selected to be the output 9c, whereby the signal from outside the semiconductor substrate 1 can be converted and then applied to the processor 5 by the PLA 6.

(C) The inputs of the input latch 23 are set to be the signals of the buses 8a-8c, and the output of the selector 24 is also applied to the bus 8c, whereby the output signal of the processor 5 can be converted and then applied to the processor 5 again by the PLA 6.

(D) The input of the input latch 23 is set to be the signal of the port 7b or 7c, and the output of the selector 24 is set to be the output 9a or 9b, whereby irrespective of the processor 5, the signal from outside the semiconductor substrate 1 can be applied to the PLA 6, and the signal obtained by the conversion of the PLA 6 can be delivered out of the semiconductor substrate 1.

By the way, it is also possible to employ two or more of the above aspects (A)-(D) in combination. For example, in the combination between the aspects (A) and (B), the inputs of the PLA 6 can be divided into two groups, one of which consists of the outputs (8a-8c) of the processor 5 and the other of which consists of the inputs (7b, 7c) from outside the semiconductor substrate 1, and also the outputs of the PLA 6 can be divided into two groups, one of which consists of the input (8c) of the processor 5 and the other of which consists of the outputs (7a, 7b) out of the semiconductor substrate 1.

Moreover, since the PLA is configured of the electrically-programmable ROM elements of the ultraviolet light-erasable type, it can also be repeatedly utilized in such a way that the elements are housed in a package with a window and that logical information is electrically written anew after old information has been erased by projecting ultraviolet light through the window.

Further, it is needless to say that the PROM elements of the PLA can be constructed of EEPROM (electrically erasable and programmable ROM) elements.

The first embodiment thus far described employs the PLA (Programmable Logic Array) as the programmable logic circuit. The PLA operates to respond to input data $D_i$ and to afford the functions of outputs $D_o=F(D_i)$ in the forms of logical products and logical sums.

Figure 6:
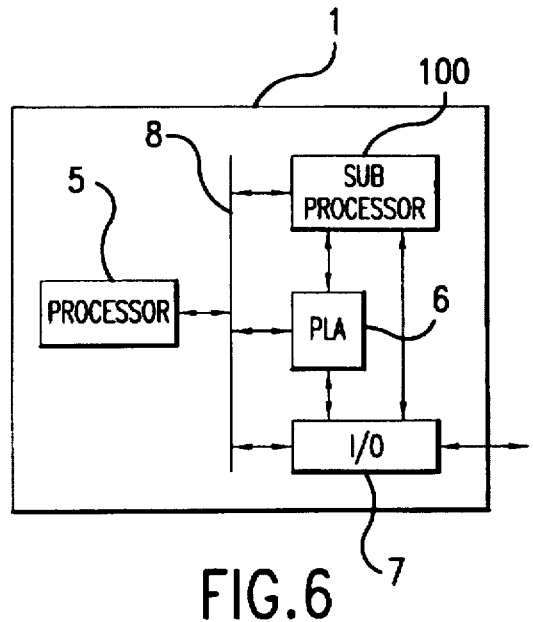
FIG. 6 is a block diagram of a single-chip microcomputer according to a second embodiment of the present invention.
Figure 5A:
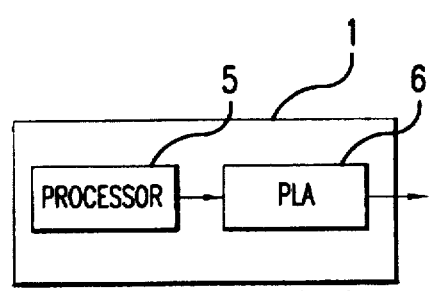
FIGS. 5(A), 5(B), 5(C), 5(D) and are diagrams for explaining the functions of the embodiment in FIG. 1.
Figure 5C:
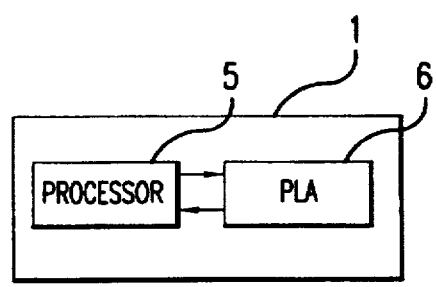
Figure 5B:
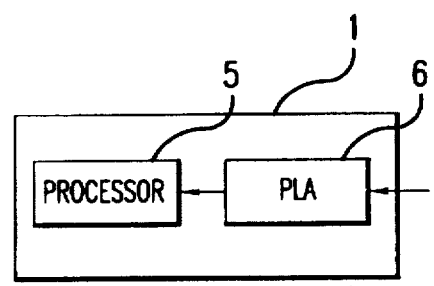
Figure 5D:
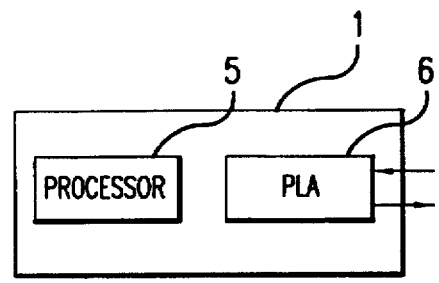

A second embodiment of the present invention will now be explained as an example of a semiconductor integrated circuit in which the second programmable logic circuit (a subprocessor) of processor structure is added to the programmable circuit, and functions being more complicated than those of the first embodiment can be realized. The semiconductor integrated circuit shown in FIG. 6 is constructed so that the subprocessor 100 connected to a common bus 8, a PLA 6 and an I/O 7 is added to the arrangement in FIG. 1.

Figure 7:
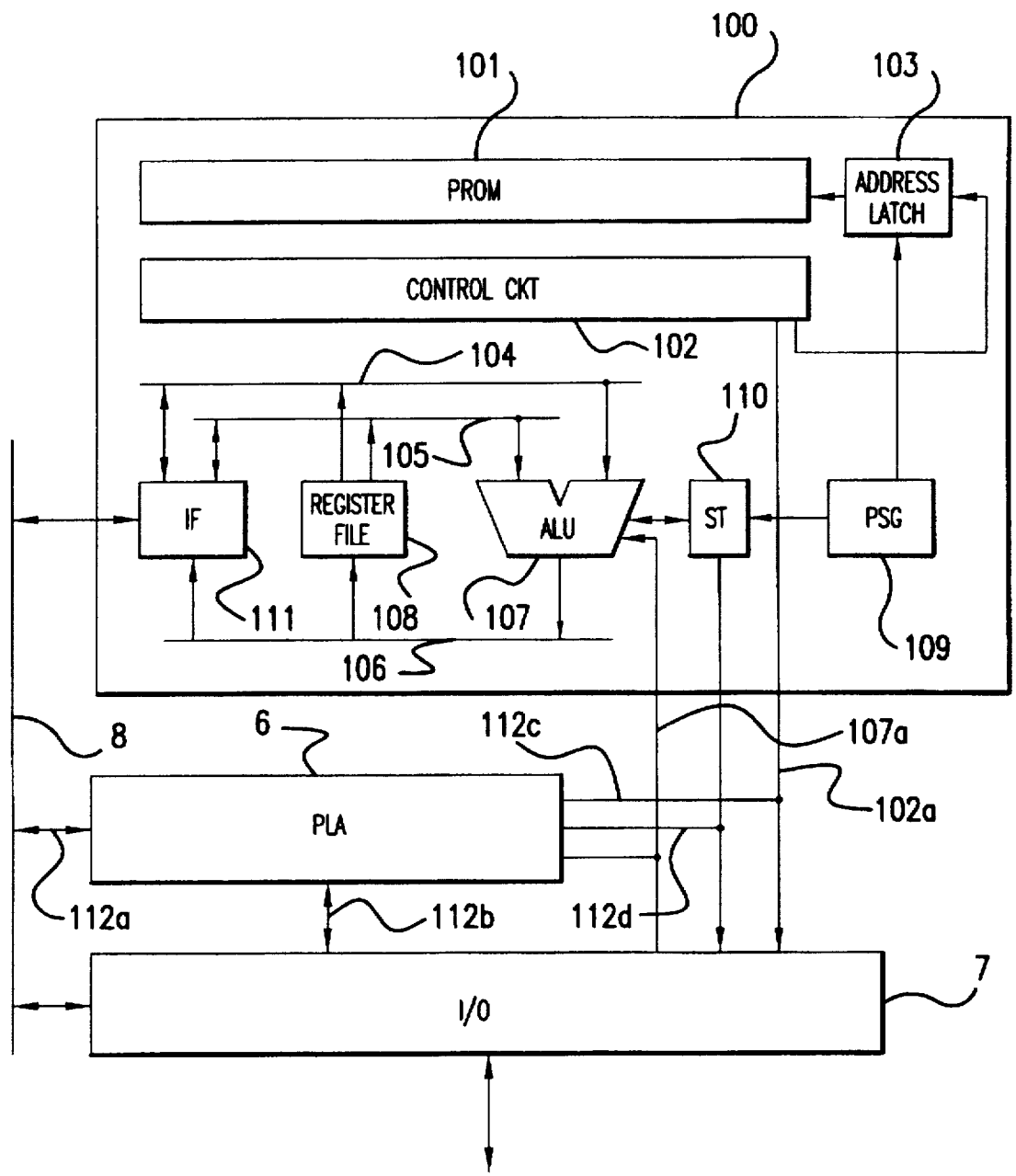
FIG. 7 is a detailed block diagram of a subprocessor illustrated in FIG. 6.

FIG. 7 illustrates the configuration of the subprocessor 100 and the connections among the subprocessor 100, PLA 6, I/O 7 and common bus 8.

The subprocessor 100 is configured of a PROM 101 for storing an instruction, a control circuit 102 for generating a control signal on the basis of the information of the PROM 101, an address latch 103 for storing the next address of the PROM, an ALU (arithmetic/logic unit) 107 which is connected to first, second and third data buses 104, 105 and 106, a register file 108, a status register (ST) 110 which is connected to the ALU and which is controlled by a programmable sequence generator (PSG() 109, and a bus interface circuit (IF) 111 for connecting the subprocessor and the common bus 8.

The PLA 6 is connected to the common bus 8 by wiring 112a, and to the I/O 7 by wiring 112b. Also, PLA 6 is supplied by wiring 112c with the control signal 102a generated by the control circuit 102 of the subprocessor 100, by wiring 112d with the output 110a of the status register 110, and by wiring 112e with a signal 107a to be applied from the I/O 7 to the ALU 107.

In this embodiment, the PSG 109 and the PROM 101 are constructed using ROM elements which are electrically programmable.

Naturally, the PLA 6 is configured of ROM elements which are electrically programmable.

Figure 8:
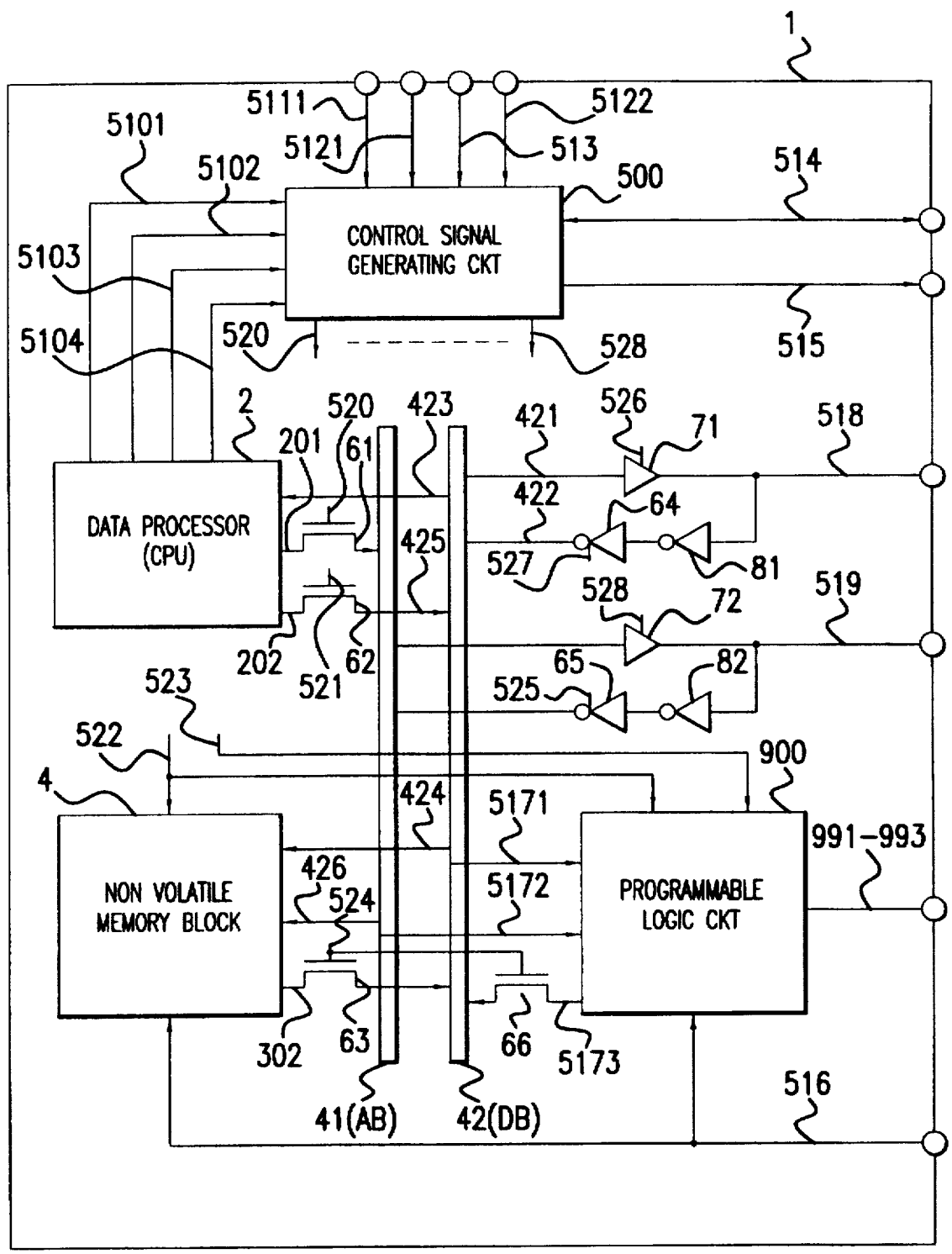
FIG. 8 is a block diagram of a single-chip microcomputer according to a third embodiment of the present invention in which a nonvolatile memory block for storing software is also built in a single chip.

FIG. 8 shows a block diagram of a signal-chip microcomputer in which a built-in nonvolatile memory block 4 for storing software is added to the single chip.

Referring to FIG. 8, numeral 1 indicates a semiconductor integrated circuit being the signal-chip microcomputer, numeral 2 a data processor such as a CPU, numeral 4 the nonvolatile memory block in the form of a software storing ROM, numeral 41 an address bus, numeral 42 a data bus, numeral 500 a control signal generating circuit, numerals 61-63 and 66 switching elements, numerals 525 and 527 three-state inverters, numerals 526 and 528 three-state drivers, and numerals 81 and 82 inverters. Each of the data processor 2, the nonvolatile memory block 4, and a programmable logic circuit 900 such as a PLA or subprocessor employing nonvolatile memory elements is connected with the address bus 41 and the data bus 42 directly or through the switching element. The address bus 41 and data bus 42 are also connected with the exterior of the chip by signal lines 518 and 519 so as to receive and deliver data. Signals 5101-5104 are control signals for data transfer as generated by the data processor 2, signals 5111-5122 are control signals afforded from outside the chip, and signals 520-528 are control signals for controlling the signal transfer timings between the address bus 41 as well as the data bus 42 and the CPU 2, the nonvolatile memory block 4, the programmable logic circuit 900 and the external input/output signals 518, 519. A signal 514 is a data load signal from outside the LSI 1, a signal 515 is a write signal out of the LSI 1, the signal 518 is the external data signal, the signal 519 is the external address signal, and a signal 516 is a high voltage signal which is required for the writing or erasing operation of the nonvolatile elements of the nonvolatile memory 4 and the programmable logic circuit 900.

In the embodiment of FIG. 8, the nonvolatile memory block 4 and the programmable logic circuit 900 which are connected to the common data bus 42 and address bus 41 have their addresses arranged in adjacent adress spaces. By designating the respectively allocated addresses, therefore, write and verify processes can be executed with an identical data format and in an identical sequence. As a result, different write sequences are not needed for the nonvolatile memory block 4 and the programmable logic circuit 900, but a common write device is usable. Also in cases of executing write and verify processes by the use of the built-in data processor 2, access is possible in the same sequence.

Figure 9:
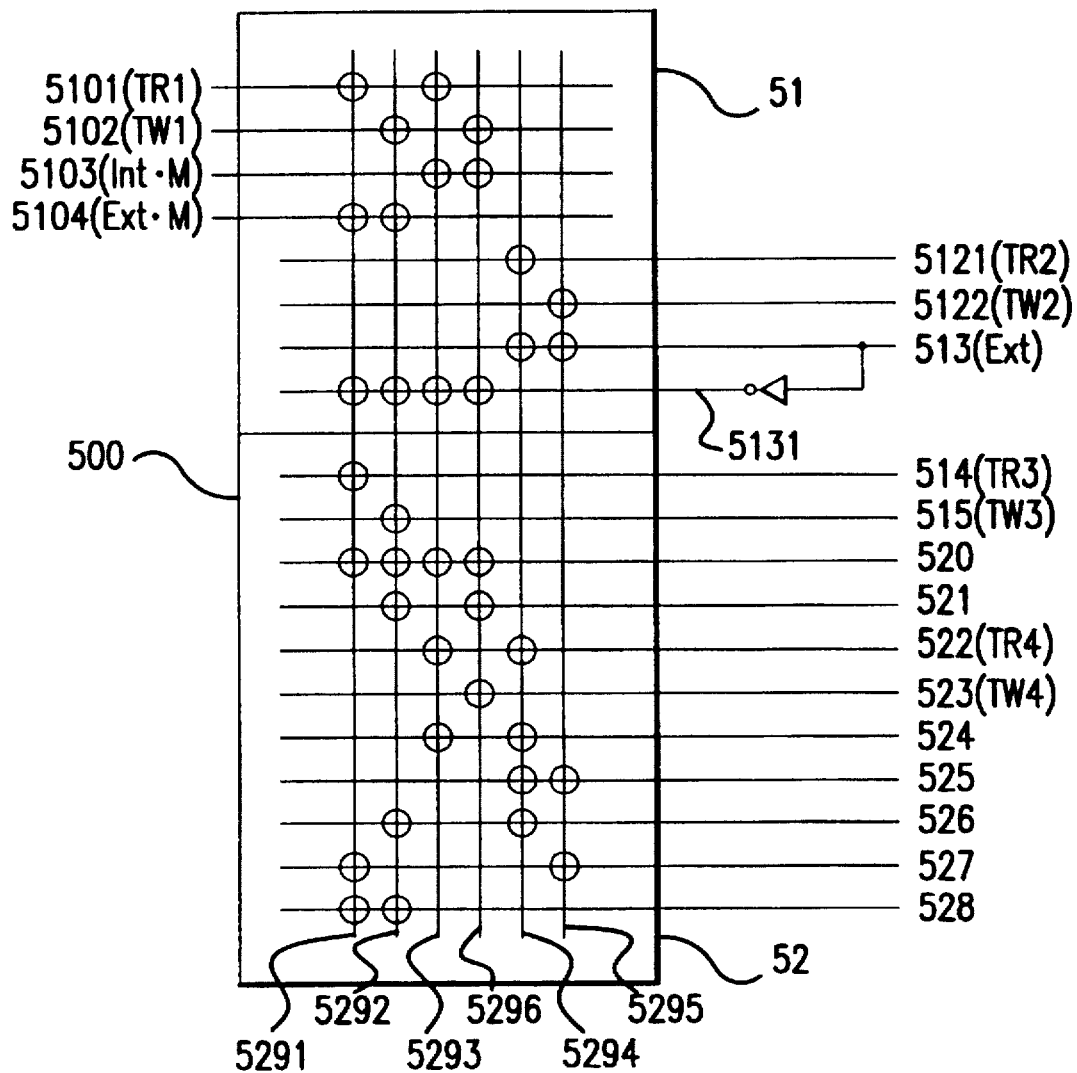
FIG. 9 is a detailed block diagram of the control signal generating circuit illustrated in FIG. 8.

FIG. 9 shows an embodiment which constructs the control signal generating circuit 500 in FIG. 8, and which is configured of an AND circuit 51 and an OR circuit 52. Numerals 5101-5104 indicate the group of signals which are generated by the CPU block 2 built in the LSI 1, and numerals 5121, 5122 and 513 the group of signals which are afforded from outside the chip. Numerals 514-528 indicate the group of signals which are produced by the control signal generating circuit 500. Now, the operation of the control signal generating circuit 500 will be described. When the signal 513 designating an external operation is low, the inverted signal 5131 thereof becomes high to validate the group of signals 5101-5104 from the CPU block. When, under this state, the signals 5101 and 5104 are high, a signal 5291 for the read mode of a device outside the LSI becomes high, and the load signal 514 out of the chip becomes high. Further, the signals 520 and 528 become high, and an address signal 201 from the CPU block 2 causes the external address signal 519 to be output via the switch 61, the address bus 41 and an output driver 72. External data having responded to the load signal 514 and the address signal 519 is loaded into the CPU block 2 via the signal line 518, the input gate 81, an internal bus driver 64 and data buses 422, 423 when the control signal 527 turns "on". Since, on this occasion, the control signal 524 is in the low state, the mixing of data from the nonvolatile memory 4 and the programmable logic circuit 900 connected to the internal bus 42 does not take place.

In a case where the signal 5131 is high and where the signals 5102 and 5104 are high, a signal 5292 for an external device write mode becomes high. As a result, the write signal 515 out of the LSI becomes high, and further, the signals 520, 521, 526 and 528 become high. As a consequence, the address signal 201 from the CPU 2 is transmitted to the signal line 519 via the portions 61, 41 and 72, while at the same time, data 202 from the CPU 2 is transmitted to the signal line 518 via the switch 62, a data bus 425, the internal bus 42, a data bus 421 and an output driver 71, whereby the writing operation of an external device is executed.

In a state in which the signal 5131 is high and in which the signals 5101 and 5103 are high, a signal for an internal device load mode, 5293 from the CPU 2 becomes high, and the control signals 520, 522 and 524 turn "on". As a result, the address signal 201 from the CPU 2 is delivered via the portions 61 and 41 so as to send an address signal 426 for the nonvolatile memory block 4 and an address signal 5172 for the programmable logic circuit 900, and the load signal 522 is simultaneously afforded. By allocating the different addresses on the adjacent address space to the nonvolatile memory block 4 and the programmable logic circuit 900 beforehand, read data is sent from either addressed circuit to the data bus 42 via a path consisting of a bus 302 and the switch 63 or via a path consisting of a bus 5173 and the switch 66, and it is loaded as the data signal 423 for the CPU 2.

On the other hand, when the signal 513 is high, the signal 5131 becomes low. Therefore, the signals 520 and 521 become low, and the transmission of the signals from the CPU 2 to the address bus 41 and the data bus 42 is inhibited, so that the CPU block 2 is operatively disconnected from the internal buses. When the signal 5121 becomes high under this state, a signal 5294 for a mode of read from an external terminal becomes high, and the control signals 522, 524, 525 and 526 are generated. As a result, the address signal 519 from the external terminal is fed via the input gate 82 and an internal address driver 65 so as to transmit the address 426 for the nonvolatile memory block 4 and to transmit the address 5172 for the programmable logic circuit 900, while at the same time, the load signal 522 is applied to the nonvolatile memory 4 and the programmable logic circuit 900. Consequently, in response to the addressing from the external terminal 519, a read signal from either of the circuits 4 and 900 is transmitted to the data bus 42 via the portions 302 and 63 or via the portions 5173 and 66, and it is read out as the data signal 518 via the portions 42, 421 and 71.

In the case where the signal 513 is high and where the signal 5122 is high, a signal 5295 for a mode of writing data from an external terminal becomes high, and the control signals 525 and 527 become high. As a result, the address signal 519 is applied to the nonvolatile memory block 4 and the programmable logic circuit 900 via the same path as in the read mode, while at the same time, the write data 518 becomes a data signal 424 for the nonvolatile memory block 4 and a data signal 5171 for the programmable logic circuit 900 via the input gate 81, internal bus driver 64 and data bus 42. Under this state, the write signal 516 is afforded from the external terminal to the circuits 4 and 900, whereby the data is written into the nonvolatile memory block 4 or the programmable logic circuit 900 in accordance with the designated address. The voltage of the write signal 516 is usually set at a voltage of about 10-25 V sufficient for the writing operation in correspondence with the nonvolatile devices which are used for the nonvolatile memory block 4 and the programmable logic circuit 900. In the case of employing electrically-programmable devices, in the state in which the signal 513 is high, an address is afforded along the same path as in the write mode, and an erase voltage is applied from an external terminal to the circuits 4 and 900, or an erase voltage is generated within the LSI and then applied to the circuits 4 and 900. Thus, the writing and erasing operations can be realized.

In the state in which the signal 5131 is high and in which the signals 5102 and 5103 are high, a signal 5296 for a mode of writing data from the CPU into an internal device becomes high, and the control signals 520, 521 and 523 become high. As a result, an address from the CPU 2 is transferred to the programmable logic circuit 900 via the portions 201, 61, 41 and 5172. In addition, data from the CPU 2 is transferred to the circuit 900 via the portions 202, 62, 42 and 5171, and the write signal 523 is simultaneously afforded. Thus, the data is written into the designated address of the programmable logic circuit 900.

Figure 10:
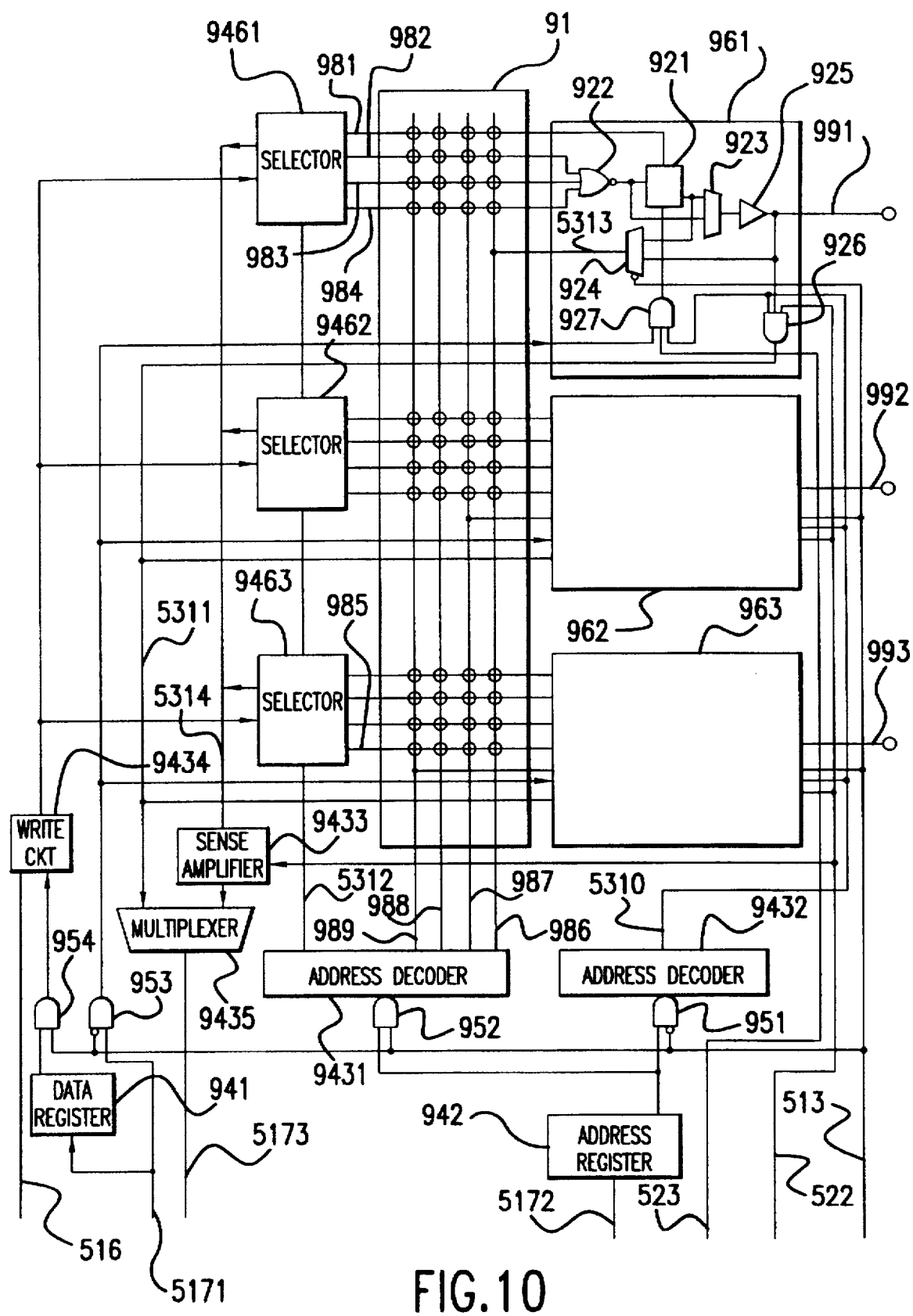
FIG. 10 is a detailed block diagram of a programmable logic circuit illustrated in FIG. 8.

Next, an embodiment of the arrangement of the programmable logic circuit 900 is shown in FIG. 10. Referring to the figure, numeral 91 indicates a NOR array constructed of a nonvolatile device, numerals 961-963 logic modules, numerals 9461-9463 selectors, numeral 9433 a sense amplifier, numeral 9434 a write circuit, numerals 9431 and 9432 address decoders, numeral 941 a data register, numeral 942 an address register, and numeral 9435 a multiplexer. The logic module 961 is configured of a NOR gate 922, a flip-flop 921, selectors 923, 924, an output driver 925, and AND gates 926, 927. This logic module 961 is of variable construction logic according to which the combination of the logical expressions of the NOR array 91 is altered by writing data into the nonvolatile elements, and the selection conditions of the selectors 923 and 924 of the logic module 961 are determined in advance, whereby various logical constructions can be made. The circuits 961–963 are connected with the data bus 42 and address bus 41 via the signal lines 5171–5173, and can transfer data from and to the exterior of the chip through terminals 991–993. In the case where the signal 513 is low, that is, the internal operation is designated, the input/output of data is directed to the logic module 961 and the flip-flop 921 included therein. In the case where the signal 513 is high, i.e., the external operation is designated, data is written into and read out of the nonvolatile elements constituting the NOR logic of the NOR array 91. Now, the operation of this embodiment will be described. In the mode of reading data out of the CPU block 2, the signal 513 becomes low, an address is transferred to the signal line 5172, and the read signal 522 becomes high. Accordingly, the address applied from the signal line 5172 is set in the address register 942 and is therefore decoded by an AND gate 951 as well as the address decoder 9432. The decoder 9432 allocates a specific address to every bit width corresponding to the bit width of the data bus 42, for the series of logic modules 961–963. The data of the flip-flop 921 is delivered via the AND gate 926 of the logic module selected by a decoder signal 5310, and the data corresponding to the bit width of the data bus 42 is read out onto the signal line 5173 through a signal line 5311 and the selector 9435. In writing data from the CPU 2, the signal 513 becomes low, an address and the data are respectively transferred to the signal lines 5172 and 5171, and the write signal 523 becomes high. Accordingly, the data becomes the input of the AND gate 927 of the logic module 961 via an AND gate 953, and it is written into the flip-flop corresponding to the selected address in synchronism with the write signal.

On the other hand, when the signal 513 is high, that is, the programmable logic circuit 900 is accessed through an external terminal, the output of the address register 942 is supplied via an AND gate 952 and the address decoder 9431 so as to select any of the word lines 986–989 of the NOR array 91. In the writing operation, data transferred to the signal line 5171 is set in the data register 941 and is input to the write circuit 9434 through an AND gate 954. The write data becomes the inputs of the selectors 9461–9463 in synchronism with the write signal of high voltage 516 applied from outside the chip, and bit lines corresponding to the bit width of the data bus 42 are selected by a selector selection signal 5312 from the address decoder 9431, whereby the data is afforded to the selected ones of the bit lines 981–985 of the NOR array 91, and the writing operation of the nonvolatile device is performed for every bit width of the data bus 42. On this occasion, the selector 924 in the logic module 961 has its output held in a high impedance state by the signal 513, and the mixing of any signal from the logic module to the word lines 986–989 is inhibited. In reading out data through an external terminal, the bit line data of the NOR array 91 designated by the address decoder 9431 is fed via the selectors 9461–9463 as in the writing operation and is read out by the sense amplifier 9433 so as to be delivered to the signal line 5173 through the selector 9435.

As thus far described, the programmable logic circuit 900 is operated depending upon the states of the external mode designation signal 513, in such a manner that data is input to or output from the flip-flop 921 in the logic module 961 when the signal 513 is low, and that data is written into or read out of the NOR array 91 constructed of the nonvolatile device when the signal is in the high state. Moreover, the length of the data can be handled as being equal to the width of the internal data bus 42. In a case where an electrically-erasable device is employed as the NOR array 91, an erasing operation can be realized with the same circuit arrangement as that necessary for the writing operation by adding an erase circuit.

With this embodiment, as regards the writing and erasing operations of the nonvolatile device of the NOR array 91, the address space of the programmable logic circuit 900 is shared by the nonvolatile memory 4, and different addresses are allocated to these portions 900 and 4, whereby the writing and erasing operations through the external terminal of the LSI can be combined. Besides, when the signal 513 is in the high state, the lines for transmitting the signals from the CPU 2 are operatively disconnected by the gates 61 and 62 in FIG. 8, so that the portions 900 and 4 become electrically equivalent to a signal nonvolatile memory.

The method taught by this embodiment can be applied to accesses from the CPU within the chip and the external terminal of the chip even in cases where the arrangement of the programmable logic circuit changes, for example, in a case where a plurality of NOR arrays exist, in a case where the construction of logic within the logic modules differs, in a case where the number of flip-flops differs, and in a case where the signal lines 991–993 laid from the logic modules to the external terminals do not exist.

Figure 11A:
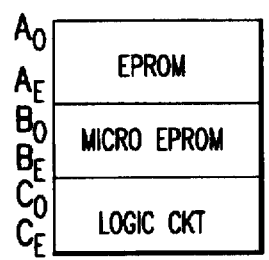
Figure 13:
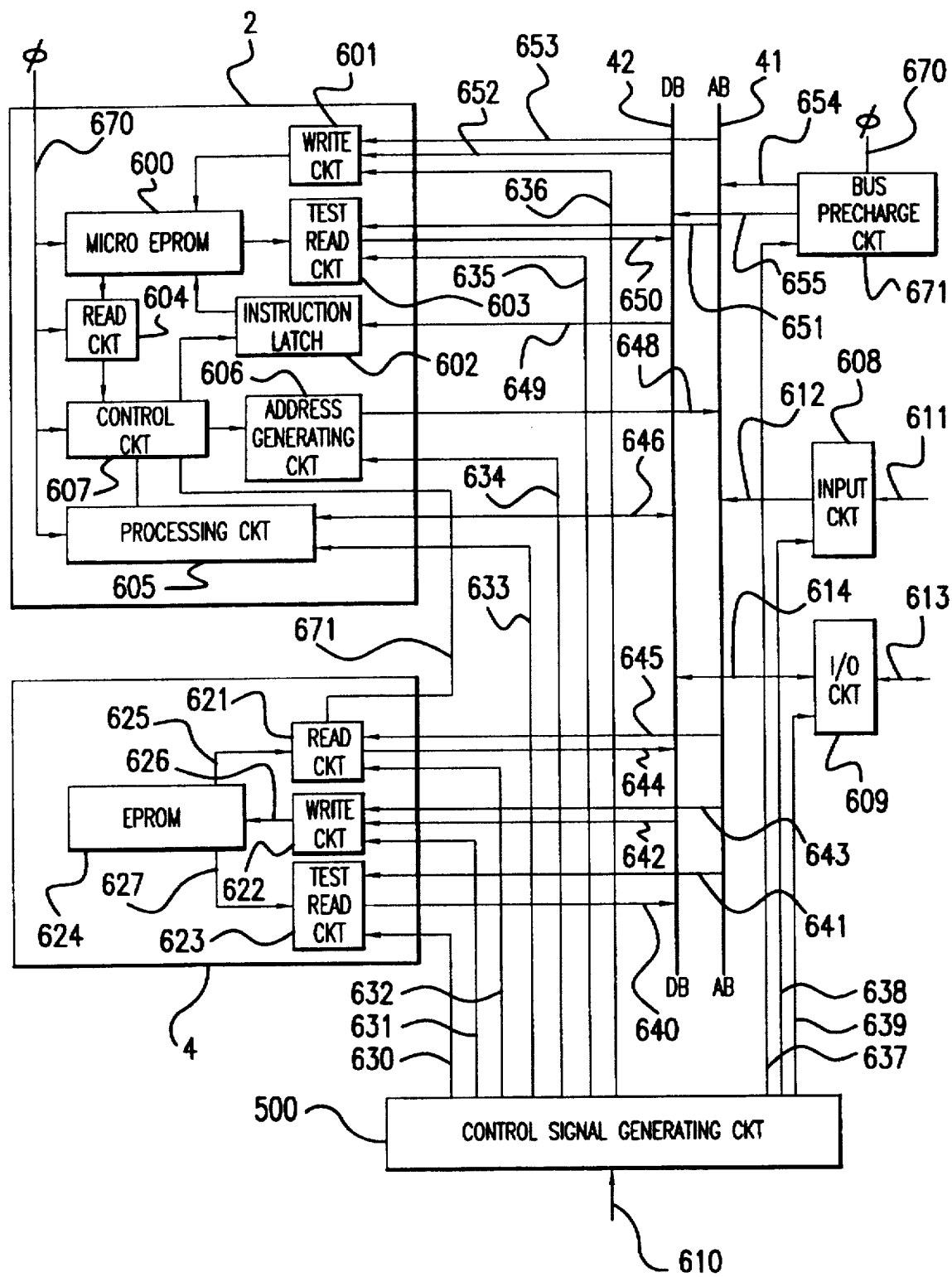
FIG. 13 is a block diagram of a single-chip microcomputer according to a fifth embodiment of the present invention.

FIG. 11(A) shows an address map in the write and test read modes of a circuit configured of nonvolatile memory elements in the case where a processor 2 and an EPROM unit 4 as shown in FIG. 13 are respectively employed as the data processor 2 and the nonvolatile memory block 4 as in FIG. 8, in other words, the modes of a micro-EPROM (μEPROM) 600, the EPROM 4 and the programmable logic circuit 900. In this example, the address bus 41 and the data bus 42 are shared by the above circuit configured of the nonvolatile memory elements, and the EPROM, μEPROM and programmable logic circuit are arranged in adjacent address spaces. That is, the EPROM corresponds to addresses $A_O$–$A_E$, the μEPROM to addresses $B_O$–$B_E$, and the programmable logic circuit to addresses $C_O$–$C_E$. The portions 2, 4 and 900 are arranged in the adjacent address spaces in this manner, and additionally, the voltage levels, timings, etc. of addresses, data and control signals necessary for the write and test read modes are conformed to a standard single EPROM, whereby the write and test read modes can be executed using the same write device as that of the single EPROM.

Figure 11B:
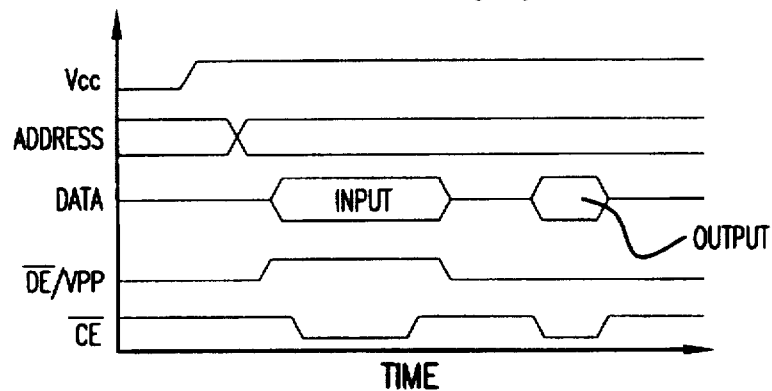
FIG. 11(B) is a diagram showing the timing chart of the data write and test read operations of the single-chip microcomputer in an example of the present invention.

FIG. 11(B) shows a timing chart of the data write and test read modes. Terminals required for the write and test read modes are a main supply voltage terminal ($V_{CC}$), an address input terminal, a data input/output terminal, a $\overline{DE}/V_{PP}$ terminal for a high voltage (about 12 V) serving both to control the direction of data input/output and to write data, and a chip enable terminal $\overline{CE}$. The number of address inputs is set at a number covering the address space illustrated in FIG. 11(A), namely, at 15 in the case of 32 kilobytes (data width: 8 bits=1 byte).

After applying a predetermined voltage (about 5 V) to the terminal $V_{cc}$, address information is sent to the address terminal, and the terminal $\overline{DE}/V_{PP}$ is changed from 0 V to about 12 V, while write data is afforded to the data terminal, and the terminal $\overline{CE}$ is changed from 5 V to 0 V. Then, writing the data into the EPROM element selected by the address information is started. The period of time during which the terminal $\overline{CE}$ is held at 0 V is determined by the characteristics of the EPROM elements, and it is about 1 msec. When the terminal $\overline{CE}$ is changed from 0 V to 5 V and the terminal $\overline{DE}/V_{PP}$ is restored to 0 V, the write mode ends.

Regarding whether or not the written data is normal, the address information is held, and the terminal $\overline{CE}$ is brought to 0 V with the terminal $\overline{DE}/V_{PP}$ held at 0 V. Then, the data of the element selected by the address can be read out to the data terminal. That is, the read test can be carried out. Whether or not the normal writing operation has been performed, can be known from the agreement or disagreement between the write data and read data at the identical address.

In a case where, as the result of the above test, the normal writing operation has been acknowledged, the single-chip microcomputer is permitted to execute a data process dependent upon the data written into the nonvolatile memory element of the logic circuit thereof.

Figure 12:
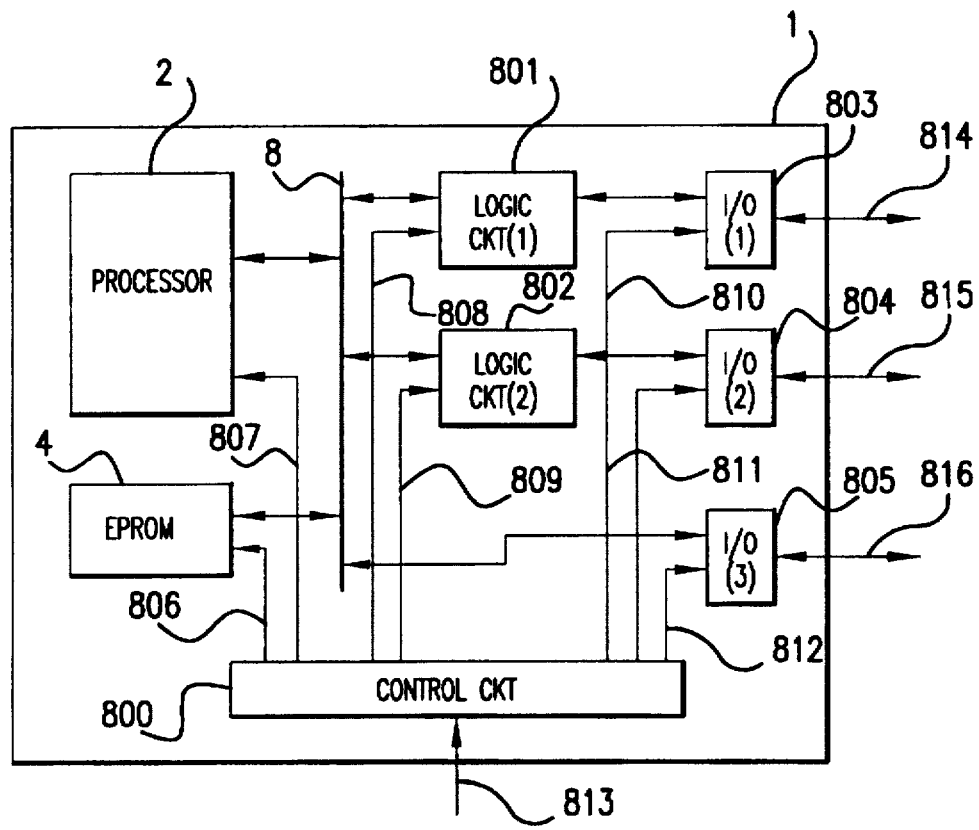
FIG. 12 is a block diagram of a single-chip microcomputer according to a fourth embodiment of the present invention.

As the third embodiment, FIG. 12 shows an example of a semiconductor integrated circuit 1 which has a processor 2, an EPROM 4, and a plurality of programmable logic circuits 801 and 802 each including nonvolatile memory elements, all the aforementioned constituents being coupled to a bus 8. The first logic circuit 801 and the second logic circuit 802 are respectively coupled to I/O units 803 and 804, so as to communicate with the exterior of the integrated circuit. Also the bus 8 can communicate with the exterior of the integrated circuit through another I/O unit 805. A control circuit 800 controls the modes of the semiconductor integrated circuit 1, namely, the normal operation thereof and the write and read test modes thereof for the built-in nonvolatile memory element, and it controls the integrated circuit on the basis of control information afforded to a control input line 813.

In the normal mode, the semiconductor integrated circuit 1 performs ordinary operations with normal operation signals applied to control lines 806–812.

On the other hand, as regards writing data into any of the devices of the EPROM 4 including nonvolatile memory elements, and the logic circuits 801 and 802, when the test mode is designated on the control input line 813, the output of the processor 2 to the bus 8 is inhibited, whereupon the integrated circuit operates as follows:

(1) Case where the EPROM 4 and the I/O unit 805 have been selected by the control input line 813:

The bus 8 is supplied with outputs by only the EPROM 4 and the I/O unit 805. In the write mode, the address and write data of the EPROM 4 are sent from an external line 816, the information required for the writing operation is transmitted to the EPROM 4 through the I/O unit 805 as well as the bus 8, and the control input 813 is supplied with a write signal, for example, the control signal ($\overline{CE}$ or $\overline{DE}/V_{PP}$) as illustrated in FIG. 1(B). In the test read mode, a read signal is applied to the control line, and the data is read out of the I/O unit 805 through the bus 8.

(2) Case where the EPROM 4 and the I/O unit 803 have been selected by the control input line 813:

The bus 8 is supplied with outputs by only the EPROM 4 and the logic circuit 801. In the write mode, information required for the writing operation is applied from the I/O unit 803 and is written into the EPROM 4 through the logic circuit 801 as well as the bus 8. The read test is similar, and the data of the EPROM 4 is read out to an external line 814 through the bus 8, logic circuit 801 and I/O unit 803.

(3) Case where the logic circuit 801 or 802 and the I/O unit 805 have been selected by the control input line 813:

The bus 8 is supplied with outputs by only the I/O unit 805 and the logic circuit 801 or 802. Data is written into the logic circuit 801 or 802 through the I/O unit 805 as well as the bus 8. In the read test mode, the data is read out of the logic circuit 801 or 802 through the bus 8 as well as the I/O unit 805.

(4) Case where the logic circuit 801 or logic circuit 802 and the I/O unit 803 or I/O unit 804 have been selected by the control input line 813:

The write mode is performed in such a way that information necessary for the writing operation of the nonvolatile memory element is received from the external line 814 or an external line 815 directly to the logic circuit 801 or logic circuit 802 through the I/O unit 803 or I/O unit 804, and that the write signal is applied to the control input line 813 as in the case (1). Also in the test read mode, the data is read directly through the I/O unit 803 or 804 from the logic circuit 801 or 802 without passing the data through the bus 8.

Next, an example of a processor employing a microprogram control method will be described with reference to FIG. 13. In this embodiment, the microprogram storing EPROM (hereinbelow, briefly termed "micro-EPROM") 600 and program storing EPROM 624 referred to before are constructed on an identical semiconductor substrate as devices which include nonvolatile memory elements.

The micro-EPROM 600 constructing the CPU 2 in the processor is connected to a write circuit 601 which is connected to an address bus 41 and a data bus 42 for writing the data of the micro-EPROM by respective wiring lines 653 and 652, a test read circuit 603 which is connected to the address bus 41 and the data bus 42 by respective wiring lines 651 and 650 in order to test the written data, and an instruction latch 602 which is connected to the data bus 42 by a wiring line 649. Further, the micro-EPROM is connected to a read circuit 604 for reading the data thereof in a normal operation. The output of the read circuit 604 is connected to a control circuit 607 which is connected to the instruction latch 602 as well as an address generating circuit 606 for generating the address of the memory and connected to the address bus 41 by a wiring line 648, and it is then connected to a processing circuit 605 which is connected to the data bus 42 by a wiring line 646. Further, the read circuit 604, control circuit 607 and processing circuit 605 are connected to a clock 0 at numeral 670.

The EPROM device 4 is constructed of the EPROM 624 connected to a read circuit 621, a write circuit 622 and a test read circuit 623 which are respectively connected to the address bus 41 and data bus 42. In addition, the read circuit 621 is connected to the control circuit 607 of the processor 2. The address bus 41 and data bus 42 are respectively connected by wiring lines 654 and 655 to a bus precharge circuit 671 which is controlled by the clock $\varnothing$ 670. Further, the address bus 41 is connected by a wiring line 612 to an input circuit 608 which is connected to a wiring line 611 laid from outside the semiconductor integrated circuit, while the data bus 42 is connected by a wiring line 614 to an input/output circuit 609 which receives and delivers data from and to an external wiring line 613.

The outputs 630–639 of a control signal generating circuit 500, which is connected to a control signal line 610 laid from outside, are connected to the aforementioned circuits in order to control the normal operation and write test operations for the EPROMs 600 and 624.

Now, the operation of this embodiment will be described.

In writing data into the micro-EPROM 600, a write mode signal is applied to the control signal input line 610. Under this state, among the outputs 630–639 of the control signal generating circuit 500, only the control signal 636 for the write circuit 601, the control signal 638 for the input circuit 608 and the control signal 639 for the input/output circuit 609 are validated, and the other signals are controlled into inhibit states. That is, outputs from the processor 2, EPROM device 4 and bus precharge circuit 671 to the data bus 42 and address bus 41 are inhibited, and the respective buses are used only for writing the data into the micro-EPROM 600 through the write circuit 601. The external connection line 611 of the input circuit 608 is supplied with address information for selecting an element from among the group of nonvolatile memory elements constituting the micro-EPROM 600, the external connection line 613 of the input/output circuit 609 controlled into an input direction is supplied with the data to be written into the memory element selected by the address, and the control input line 610 is supplied with a write signal. In testing whether or not the written data is proper, a signal for the test read of the micro-EPROM 600 is applied to the control input line 610. Then, among the outputs 630–639 of the control signal generating circuit 500, the control signal 635 for the test read circuit 603, the control signal 638 for the input circuit 608 and the control signal 639 for the input/output circuit 609 are validated.

Under this state, the external input line 611 is supplied with address information, and the control input line 610 is supplied with a test read signal for the micro-EPROM 600. Then, the input/output circuit 609 is controlled into an output direction, and the addressed content of the micro-EPROM 600 is delivered to the external connection line 613 through the test read circuit 603, connection line 650, data bus 42, connection line 614 and input/output circuit 609.

Likewise to the write and test read modes of the micro-EPROM 600 as stated above, those of the EPROM elements 624 of the EPROM device 4 are performed by controlling the write circuit 622, the test read circuit 623 and the input circuit 608 as well as the input/output circuit 609 by means of the control signals from the control signal generating circuit 500.

The operation of the semiconductor integrated circuit in the normal mode proceeds in synchronism with the clock Ø 670, as follows:

Address information generated by the address generating circuit 606 of the CPU 2 is sent to the read circuit 621 of the EPROM device 4 through the address bus 41, while data in the EPROM elements 624 is read out on the basis of the signal of a read signal line 671 laid from the control circuit 607 of the CPU 2 and is loaded in the instruction latch 602 of the processor 2 through the data bus 42. The information held in the instruction latch 602 is applied to the micro-EPROM 600, and on the basis of the information, the element of the micro-EPROM 600 is selected. The information of the selected element is read out by the read circuit 604.

The information read out serves as control information for the processor and the semiconductor integrated circuit.

More specifically, the data of the micro-EPROM 600 read out by the read circuit 604 is input to the control circuit 607 to control the processing circuit 605, address generating circuit 606, instruction latch 602, memory read circuit 621, etc. Besides, in the normal operation, the data bus 42 and address bus 41 operate after being precharged by the bus precharge circuit 671 which operates in synchronism with the clock Ø 670.

Thus, the series of operations of the semiconductor integrated circuit proceed in synchronism with the clock which is supplied to the processor. It is noted that the numbers of the parallel output bits of the test read circuit 603 and the read circuit 604 of the CPU 2 need not be equal. Besides, in this embodiment, the number of the parallel output bits from the test read circuit 603 is equalized to the number of bits of the data bus 42.

Figure 14:
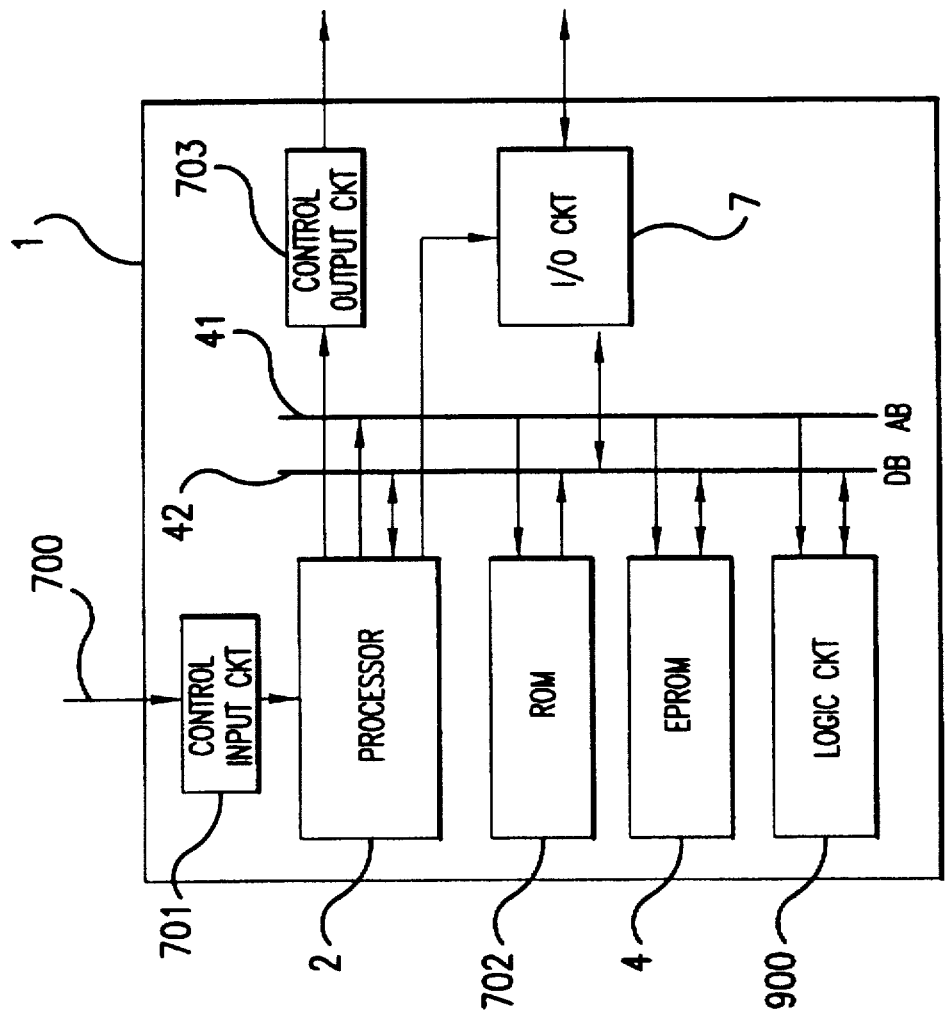
FIG. 14 is a block diagram of a single-chip microcomputer according to a sixth embodiment of the present invention.

As another embodiment, FIG. 14 shows an example of construction in which the write and read test modes of a built-in EPROM or programmable logic circuit are performed by a processor built in an integrated circuit.

Referring to the figure, a processor 2 which is controlled by a control input circuit 701 connected to a control input line 700 and serving to control the mode of a semiconductor integrated circuit 1, a ROM 702 which serves to store a write program and a test program, an EPROM 4, and a programmable logic circuit 900 which is configured of nonvolatile memory elements, are each connected to a data bus 42 and an address bus 41.

An input/output circuit 7 which is controlled by the processor 2 for the communications of data, addresses, etc. between the semiconductor integrated circuit 1 and the exterior thereof, is also connected to the data bus 42. Further, a control output circuit 703 for affording control information to the external device of the semiconductor integrated circuit 1 is controlled by the processor 2. When the control input line 700 is supplied with a signal for the write mode of the EPROM 4 having PROM elements or the logic circuit 900, information is transmitted to the processor 2 through the control input circuit 701, and the processor 2 is operated according to the write program stored in the ROM 702, as follows:

The processor 2 requests the exterior of the integrated circuit 1 through the control output circuit 703 to send information items necessary for the wiring operation, namely, address information and data, and it controls the input/output circuit 7 into an input direction and loads the information items therein through the data bus 42. Subsequently, the processor 2 identifies the EPROM 4 or the logic circuit 900 and executes the writing operation on the basis of the information items. After the end of the writing operation, the processor 2 reads out the written data and loads the read data therein, and it compares the written data with the write data to decide whether the writing operation has been normal or abnormal. The result of the decision is delivered to the exterior of the integrated circuit 1 through the control output circuit 703. If, in this case, the writing operation has been abnormal, the processor 2 is stopped and the write program is suspended after the delivery of the result.

In contrast, if the normal writing operation has been executed, a request signal for obtaining information required for a writing operation is output again. Thereafter, such operations are repeated.

The operating example described above is a mere example, and various write and test systems can be realized depending upon the ways of setting the programs of the ROM 702.

As described in detail in conjunction with the foregoing embodiments, according to the present invention, the versatility of a single-chip MC can be enhanced, so that the number of components to construct the MC and the peripherals thereof can be reduced. Moreover, since users can write logical information by themselves, recent circuit changes can also be made promptly, and hence, the cost is reduced.

Besides, in a semiconductor circuit which includes a programmable logic circuit including nonvolatile elements, a nonvolatile memory, and a data processor (such as a CPU), addressing and how to afford data can be made identical for the writing and erasing operations of the nonvolatile elements in the programmable logic circuit. As regards the writing and erasing operations of a nonvolatile device, usually the writing or erasing period of time is longer as compared with the writing or reading period of time of a memory, for example, RAM configured of volatile semiconductor elements, and a higher voltage is required. In some cases, the nonvolatile device needs to be processed in a specified sequence. A dedicated write or erase circuit for the writing or erasing operation needs to be prepared. In contrast, according to the present invention, the nonvolatile device included in the programmable logic circuit are interfaced with the same address and data control signals as those of the nonvolatile memory, thereby to bring forth the effect that the write or erase circuit of the nonvolatile device can be shared with the nonvolatile memory. Especially in executing a writing or erasing operation from an external terminal, a write device conforming to the specifications of the nonvolatile memory has heretofore been used for the writing, erasing or testing operation. According to the present invention, there is the effect that the same write device can be used even for the built-in programmable logic circuit.

What is claimed is:

1. A semiconductor integrated circuit device formed on a single chip, comprising:

a central processing unit;

an interface circuit;

an internal bus coupled to the central processing unit and coupled to the interface circuit;

a variable logic circuit coupled to the internal bus, the variable logic circuit including:

a plurality of non-volatile memory elements storing instructions, a control circuit which generates control signals in accordance with the instructions stored in the plurality of non-volatile memory elements, and an arithmetic logic unit which is controlled by the generated control signals; and a control signal line coupled between the variable logic circuit and the interface circuit to provide at least one control signal from the variable logic circuit to the interface circuit without using the internal bus, wherein said interface circuit is controlled by said at least one control signal.

2. A semiconductor integrated circuit device according to claim 1, wherein the variable logic circuit is a sub-processor.

3. A semiconductor integrated circuit device according to claim 2, further comprising an electrically programmable read only memory storing instructions to be executed by the central processing unit.

4. A semiconductor integrated circuit device according to claim 1, further comprising an electrically programmable read only memory storing instructions to be executed by the central processing unit.

5. A microcomputer integrated on a semiconductor chip, comprising:

a central processing unit;

an input/output port;

a bus coupled to the central processing unit and coupled to the input/output port;

a subprocessor including:

a programmable read only memory which has a plurality of non-volatile memory elements storing instructions, an address latch storing an address of the programmable read only memory, the address latch having an output coupled to the programmable read only memory and having an input, a programmable sequence generator coupled to the address latch, a control circuit generating a plurality of control signals in accordance with the instructions stored in the programmable read only memory, the control circuit being coupled to the input of the address latch, internal data buses, an arithmetic logic unit coupled to the internal data buses and controlled by the generated control signals, a register file coupled to the internal data buses, and a bus interface coupled between the bus and the internal data buses; and a control signal line coupled between the subprocessor and the input/output port to provide at least one control signal from the subprocessor to the input/output port without using the bus, wherein said input/output port is controlled by said at least one control signal.

6. A microcomputer integrated on a semiconductor chip according to claim 5, wherein the programmable sequence generator includes n on-volatile memory elements.

7. A microcomputer integrated on a semiconductor chip according to claim 5, further comprising:

an electrically programmable read only memory coupled to the bus, the electrically programmable read only memory storing instructions to be executed by the central processing unit.

8. A microcomputer integrated on a semiconductor chip according to claim 5, further comprising:

an electrically programmable read only memory storing instructions to be executed by the central processing unit.

* * * * *

UNITED STATES PATENT AND TRADEMARK OFFICE
CERTIFICATE OF CORRECTION

PATENT NO. : 5,784,637
DATED : 21 July 1998
INVENTOR(S) : Terumi SAWASE et al.

It is certified that error appears in the above-identified patent and that said Letters Patent is hereby corrected as shown below:

| Column | Line | |
|--------|------|---|
| 11 | 53 | Change "FIG. 1(B)" to --FIG. 11(B)--. |
| 11 | 54 | Change "1/O" to --I/O--. |
| 12 | 45 | Change "clock 0" to --clock $\phi$--. |

Signed and Sealed this

Seventeenth Day of August, 1999

Attest:

*Attesting Officer*

Q. TODD DICKINSON

*Acting Commissioner of Patents and Trademarks*